United States Patent [19]
Beierle et al.

[11] Patent Number: 5,618,321
[45] Date of Patent: Apr. 8, 1997

[54] PYROLYSIS GASIFIER WITH INNER SLEEVE MEMBER

[75] Inventors: Leonard G. Beierle, Prosser; Leroy Graff, Mabton, both of Wash.; John J. Fitzgerald, Omaha, Nebr.

[73] Assignee: Thermal Technologies, Inc., Omaha, Nebr.

[21] Appl. No.: 306,816

[22] Filed: Sep. 15, 1994

[51] Int. Cl.$^6$ .................................... C10J 3/68
[52] U.S. Cl. ............... 48/76; 48/62 R; 48/77; 48/87; 48/203
[58] Field of Search ................... 48/62 R, 63, 67, 48/68, 69, 76, 77, 87, 111, 209, 203; 202/93–95, 211, 214; 422/227, 241, 156

[56] References Cited

U.S. PATENT DOCUMENTS

| | | | |
|---|---|---|---|
| 1,897,950 | 2/1933 | Battin et al. | 48/67 |
| 2,306,030 | 12/1942 | Zeuch | 48/76 |
| 2,538,059 | 1/1951 | Strunk | 422/241 |
| 2,832,678 | 4/1958 | Van Ackeren | 48/67 |
| 3,264,068 | 8/1966 | Ghetto et al. | 422/241 |
| 3,476,283 | 11/1969 | Heinze et al. | 422/241 |
| 3,515,520 | 6/1970 | Hervert | 422/241 |
| 4,028,068 | 6/1977 | Kiener | 48/209 |
| 4,134,738 | 1/1979 | Bress et al. | 48/87 |
| 4,530,702 | 7/1985 | Fetters et al. | 48/209 |
| 4,584,947 | 4/1986 | Chittick | 48/209 |
| 4,738,205 | 4/1988 | Beirle et al. | 48/111 |
| 4,764,185 | 8/1988 | Mayer | 48/76 |
| 4,929,254 | 5/1990 | Kooiman et al. | 48/76 |
| 5,096,463 | 3/1992 | Beirle et al. | 48/76 |
| 5,133,780 | 7/1992 | Sadowski | 48/76 |
| 5,139,535 | 8/1992 | Strickland et al. | 48/76 |
| 5,407,455 | 4/1995 | Nilsson | 422/241 |

FOREIGN PATENT DOCUMENTS

| | | | |
|---|---|---|---|
| 0141837 | 5/1980 | Germany | 48/67 |

*Primary Examiner*—Timothy McMahon
*Attorney, Agent, or Firm*—Jensen & Puntigam, P.S.

[57] ABSTRACT

A pyrolysis gasifier includes a first auger (26) which moves carbon from a carbon collection tank (24) through an air lock valve (30) to a carbon holding tank (28). The gasifier includes an inner cylindrical sleeve (80) which is configured such that there is a small air gap between it and an interior wall of the gasifier (16). The air lock valve (30) includes an inlet member (96) which connects the housing to a connecting tube from the first auger (26). A plate (100) within the housing is mounted such that in a closed position, the plate is sealingly positioned against a lower edge of the inlet member (96), while in an open position, the plate is away from the inlet member, permitting carbon to move into the carbon holding tank. A fuel spreader apparatus 53 is positioned at the top portion of the gasifier. It includes a stirring rod (44) and two opposed fuel paddle assemblies (67, 69) at the lower end thereof to spread the fuel over the cross-sectional area of the gasifier.

8 Claims, 4 Drawing Sheets

5,618,321

PYROLYSIS GASIFIER WITH INNER SLEEVE MEMBER

TECHNICAL FIELD

This invention relates generally to a pyrolysis gasification system, and more particularly concerns several specific structural features used in various portions of the gasifier system.

BACKGROUND OF THE INVENTION

Gasification systems are in general well known for the conversion of biomass material into carbon and/or ash, with the production of synthetic fuel gas (syn gas) being the major product of the system. Examples of such a gasification system generally similar to that of the present invention are shown in U.S. Pat. No. 4,530,702 to Fetters et al, and more recently, in U.S. Pat. No. 5,106,390 to Beierle et al. While such gasifiers have been known to perform well under certain controlled conditions, it has been difficult to obtain consistent, reliable results from such gasifiers over extended, continuous operating times, i.e. 24 hours to several days, times which are necessary for practical commercial operation. There are often difficulties with the actual physical structure of the gasifier, particularly the welds and rivets thereof. Such difficulties are principally caused by the very high internal temperatures of the gasifier, produced by the pyrolysis reaction in the gas production bed established in the gasifier, in combination with the frequent start-ups and shut-downs encountered in normal operation and the resulting expansion/contraction stress produced on the metal components of the gasifier.

In addition, there are often difficulties with maintaining the uniformity of the pyrolysis zone and in insuring the absence of channeling in the gas production bed. Further, there is often turbulence which exists at the gas discharge ports, caused by the movement of gas as it proceeds from the gas production bed through the discharge ports. During operation, it is important to maintain the lower section of the gas production bed in a highly controlled state, including strict control over the introduction of oxygen into the gas production bed as well as over the respective temperatures and depth of the various portions of the production bed.

It is also important to prevent the introduction of air into the gasification system from the rear end of the system, i.e. at the point where the carbon or ash residue is removed from the system, and thereby also insure continued operation of the gasifier during carbon off-loading.

Further, it is important to distribute the fuel properly upon its entry into the upper portion of the gasifier. This helps to insure proper operation of the gasifier.

DISCLOSURE OF THE INVENTION

Accordingly, one feature of the present invention includes a pyrolysis gasifier for reducing biomass input material to produce fuel gas, wherein the gasifier includes means for receiving biomass input, a main body portion which includes means for supporting a pyrolysis gasification bed, and means for removing biomass residue from the gasifier; the feature further includes a sleeve member positioned internally of the gasifier means, the sleeve member being dimensioned such that it is spaced a distance inwardly from an inner wall of the gasifier, and means for supporting the sleeve member on the gasifier.

Another feature of the present invention is an airlock valve for use in a carbon extraction system portion of a pyrolysis gasifier which converts biomass material to a carbon residue and produces a fuel gas, wherein the carbon removal system includes a carbon holding tank and a means for moving carbon from the gasifier to the carbon holding tank, wherein the valve includes a housing which extends upwardly from an upper surface of the carbon holding tank about an opening therein; an inlet element which extends down into the housing and which has an upper end which connects in a sealing relationship to the carbon moving means; and a plate-like member which is rotatable between an open position and a closed position, wherein an upper surface of the plate member comes into sealing contact with a free lower edge of the inlet member when the plate member is in its closed position.

A further feature of the present invention is a fuel spreader assembly for use in a gasifier, wherein the fuel spreader comprises a support rod; a support assembly, fixedly connected to the support rod in the vicinity of the lower end thereof; two generally opposed fuel paddle assemblies, each paddle assembly being rotatably connected to the support assembly for movement thereof in a vertical plane, wherein the paddle assemblies have at least one opening therethrough; and cover means movably mounted on the paddle assembly, for selectively closing at least a portion of said opening.

BEST MODE FOR CARRYING OUT THE INVENTION

Figure 1:
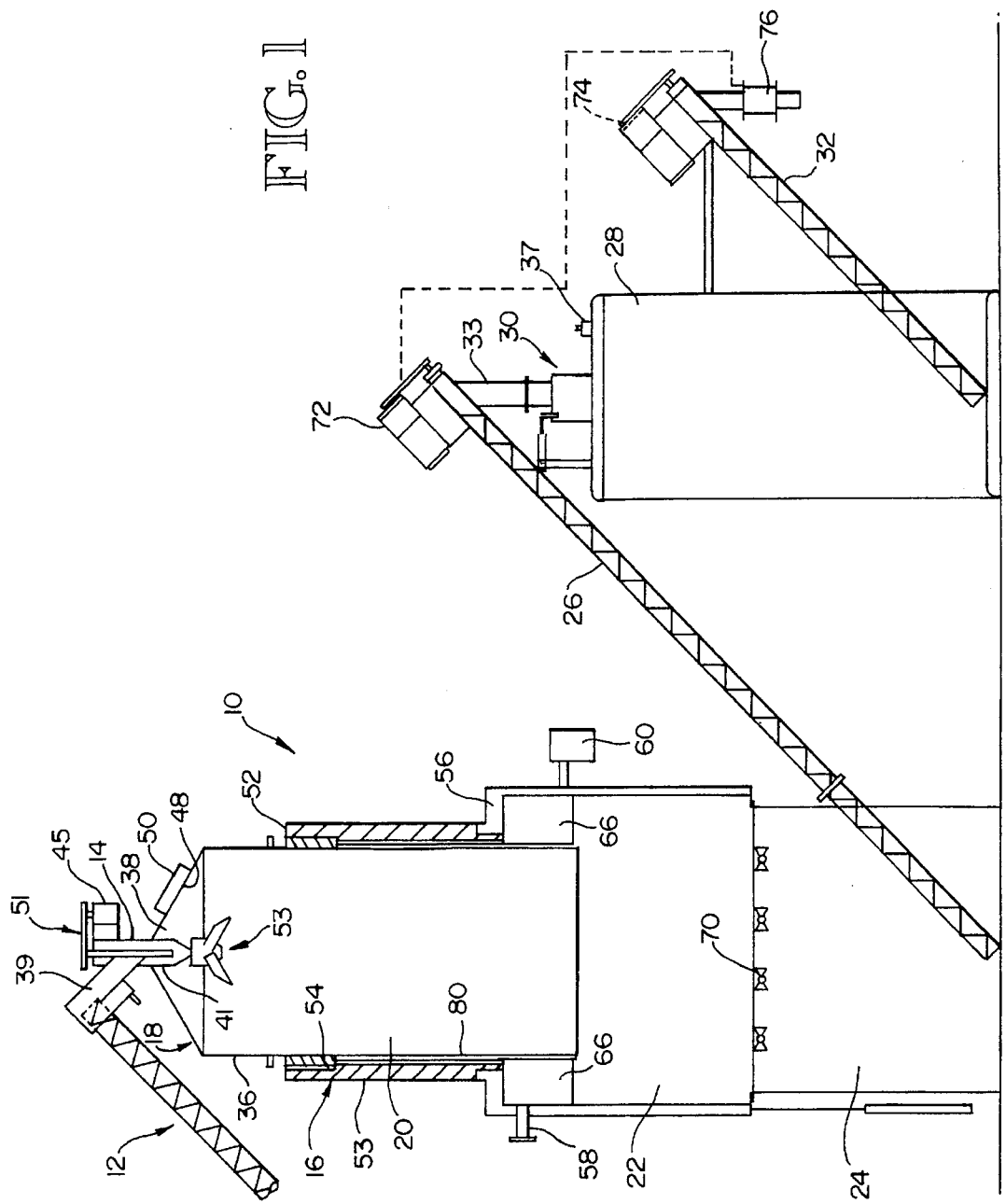
FIG. 1 is a schematic diagram showing a gasifier system which incorporates the inventions described herein.

Referring to FIG. 1, a gasifier system which incorporates the present invention is shown generally at 10. The system includes a biomass feed auger 12 which extends from a biomass supply (not shown) to an inlet element 14 to a gasifier assembly 16, the inlet element 14 being located at the top of gasifier 16. The gasifier 16 itself basically comprises, in sequence, a top section 18, an upper retort section 20, a lower retort section 22 which includes a star valve arrangement at the bottom thereof, and a carbon collection tank 24.

Extending from the carbon collection tank 24 is a first carbon auger 26, which moves carbon from collection tank 24 to a holding tank 28 through an air lock valve 30. A second carbon auger 32 extends from holding tank 28 and deposits the carbon into containers for storage or shipment.

In the embodiment shown, feed auger 12 is 6 inches in diameter and mates with one end of inlet 14. The top section 18 includes a cone-shaped hood 38 and a lower cylindrical section 36 which itself is 48 inches in diameter and 20 inches high, extending downwardly from hood 38. Inlet element 14 includes a downwardly angled connecting tube 39 which opens into a pellet entry tube 41 which in turn extends down into the gasifier 16 through hood 38 at approximately the top center thereof. The pellet entry tube 41 is approximately 21 inches long and approximately 8 inches in diameter. The lower end of tube 41 angles inwardly to a diameter of approximately 4 inches.

Figure 4:
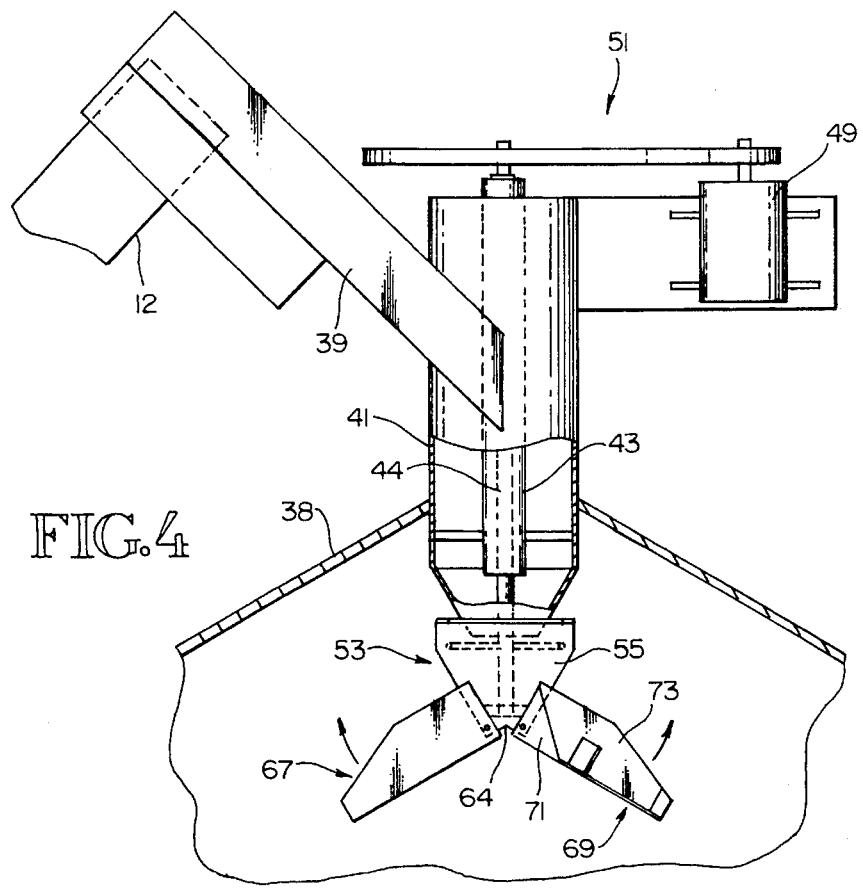
FIG. 4 is a side elevational view of the fuel inlet and fuel spreader of the gasifier of FIG. 1.

Mounted vertically centrally within entry tube 41, as shown in FIG. 4, is a sleeve 43 within which is positioned a mounting rod 44. Mounted at the lower end of rod 44 is a fuel spreader assembly 53, which spreads the fuel which enters the gasifier through entry tube 41 evenly over the interior area of the gasifier in the top section thereof. The fuel spreader assembly 53 is rotated by a motor 49 which drives a pulley and belt assembly 51, one pulley of which is mounted to the upper end of rod 44. Positioned in hood 38 is a 12-inch round inspection opening 48, permitting viewing access to the top section of the gasifier upon removal of a cover 50.

Figure 5:
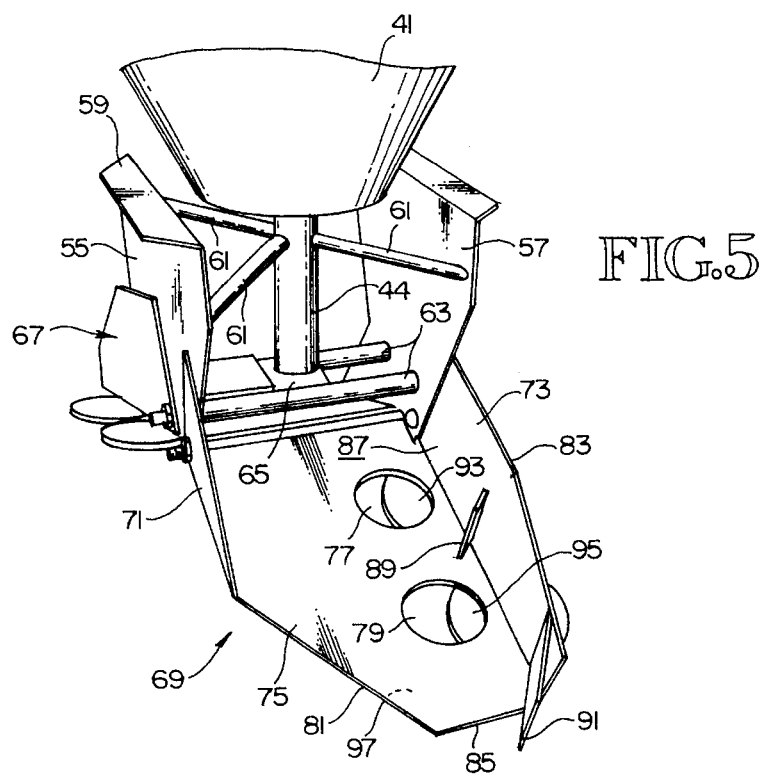
FIG. 5 is a schematic view of the fuel spreader of FIG. 4.

FIGS. 4 and 5 show in more detail the fuel spreader assembly shown generally in FIG. 1. Mounted at the lower end of support rod 44 are two spaced, vertically oriented support plates 55 and 57. Support plates 55 and 57 are made of steel, approximately ⅛ inches thick. They are approximately 8 inches wide at the top thereof and extend downwardly for approximately 2 inches before tapering slightly inwardly. The lower edge of pellet entry tube 41 is located between support plates 55, 57, approximately 1 inch below the upper edge of the support plates. The bottom edge 64 of each support plate 55 and 57 has a shallow inverted "V" configuration, thereby defining two spaced bottom points. At the top of each support plate 55 and 57 is a narrow horizontal lip 59 which extends horizontally outwardly from the support plates.

Support plates 55 and 57 are rigidly connected to rod 44 by bracing rods 61—61, which are generally horizontal, all positioned approximately in the same plane and are orthogonal to each other, such that they form a large X in plan view. Two parallel connecting rods 63—63 in addition extend between the two plates 55, 57 near the lower ends thereof. A support member 65 extends between the two connecting rods 63—63 near the longitudinal midpoints thereof, to which the lower end of rod 44 is welded. The bracing rods 61, the connecting rods 63, and the support member 65 are all designed to provide a substantial rigidity and strength for support plates 55 and 57 relative to rod 44.

Fuel paddles 67, 69 extend from and are rotatably connected to opposing side edges of support plates 55 and 57. Each fuel paddle includes side plate elements 71 and 73 and an intermediate base plate element 75. The two paddles are reversed, relative to each other, however, so that in FIG. 4 side element 71 of paddle 69 is in front, while the reverse is true for paddle 67. In base element 75 are circular openings 77 and 79, positioned in line adjacent one side element 73. The fuel paddles 67 and 69 are connected to the support plates by their respective side plate elements so that the distance between side elements 71 and 73 is approximately the same distance as between support plates 55 and 57. The fuel paddles 67 and 69 are rotatably connected to the support plates, such that they may be rotated in a vertical plane, as shown in FIG. 4.

The base plate element 75 of each fuel paddle is generally rectangular, with one corner 81 being diagonally cut away. The opposing side plate elements 71 and 73 are each somewhat irregular in configuration, but extend along complete opposing sides of the fuel paddle. Side element 71 is generally triangular in configuration, while side element 73 is generally rectangular, with the top edge 83 thereof angled downwardly slightly toward the distal end edge 85 of the base plate element. Extending inwardly a short distance from an inner surface 87 of side element 73 are two small baffle plates, 89 and 91, positioned at an angle relative to the side element.

Selectively covering a portion or in some cases none or all of openings 77 and 79 are a pair of cover disks 93 and 95. Each cover disk is rotatably mounted to the underside (lower surface) 97 of base plate element 75 and lie adjacent underside 97. The cover disks are mounted such that they may be rotated, respectively, to cover all of an opening, a selected portion thereof, or may be rotated completely out of the way, leaving the opening completely unobscured. The angular position of the fuel paddles and the position of the cover disks 93, 95 relative to the openings 77, 79 may be varied depending upon the size and nature of the input fuel pellets to the gasifier.

The above described spreader assembly provides a reliable and efficient means for spreading the fuel pellets as they enter the gasifier 16 through the inlet element 14.

Figure 2:
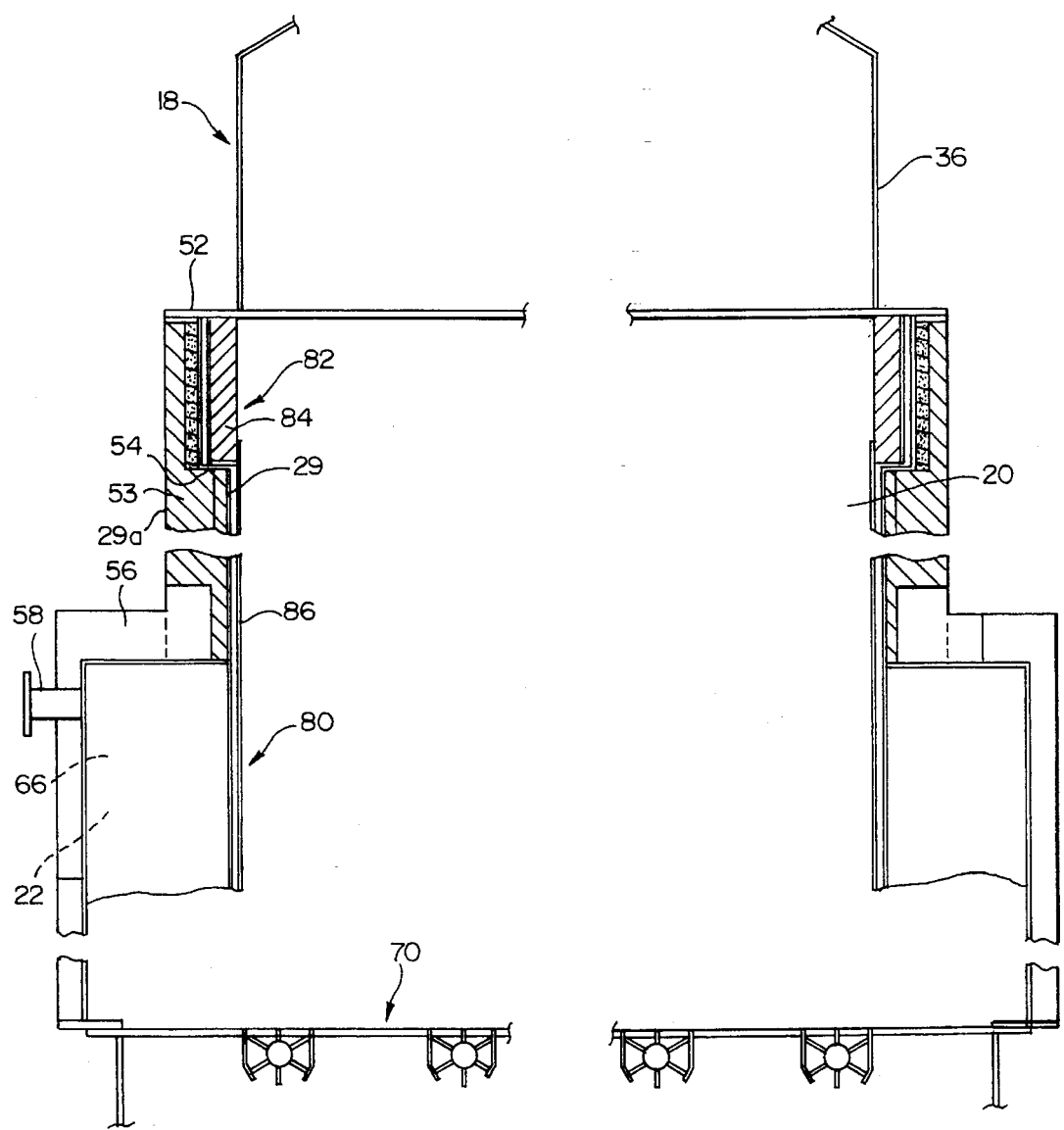
FIG. 2 is a cross-sectional view showing a portion of the gasifier system of FIG. 1.

Referring now to FIGS. 1 and 2, the bottom edge of lower cylindrical section 36 of top section 18 is a horizontal flange 52, which extends outwardly therefrom for approximately six inches. Flange 52 is bolted at spaced locations to the upper end of the upper retort section 20 of gasifier 16. The upper retort section 20 is cylindrical, approximately 54 inches high, with an exterior diameter of 60 inches over most of its height.

The interior diameter of the upper retort is approximately 48 inches over most of its length, except for a 12-inch portion at the upper end thereof, which is stepped outwardly so that the internal diameter of the 12-inch portion is approximately 54 inches, defining thereby a circular shoulder section 54. Between the two walls 29, 29a which define the interior and exterior diameters of the upper retort, is fiberglass insulation 53. This is primarily for heat retention and uniformity of operating temperature across the gasifier. At the lower end of the upper retort, the two walls of the upper retort extend outwardly for a distance of approximately eight inches, thereby defining a circular exterior shoulder section 56.

Extending downwardly from the shoulder section 56 is the lower retort 22 which has an internal diameter of 72 inches and an external diameter of approximately 78 inches. A blower 60 (FIG. 4) is provided to move cooling air between the walls of the lower retort and then out through an exit duct (not shown). This assists in the cooling of the gas production bed in the gasifier and helps to reduce heat stress on the walls of the gasifier. Gas discharge ports 58 are provided around the periphery of the lower retort near the upper end thereof.

The length of the lower retort is approximately 60 inches in the embodiment shown. Provided at spaced points around the interior periphery of the gasifier are a plurality of gussets or bracing members 66 which are welded between the inner wall of the lower retort and the shoulder section 56. The bracing members 66 are each approximately eight inches by 19 inches, and are for the internal strength of the gasifier.

At the lower end of the lower retort 22 is a star valve assembly 70, the operation of which is controlled by a motor (not shown). When the gasifier is in operation a gas production bed is established in the gasifier, supported by the star valve assembly. The gas production bed will include a pyrolysis reduction zone in which volatiles are driven off from the biomass input material and fuel gas is produced, the fuel gas moving out through the gas discharge ports. A detailed description of the pyrolysis bed, various operating temperature conditions, and monitoring elements are set forth in the '702 and '390 patents listed above, the contents of which are incorporated by reference herein. Operation of the star valve removes carbon from the lower retort 22 into carbon collection tank 24.

The carbon collection tank 24 is a single wall member having an internal diameter of 66 inches and a height of 60 inches in the embodiment shown. Auger 26 extends from the lower end of the carbon collection tank, approximately central thereof, outwardly from the tank through an opening in the side thereof, at an angle of approximately 60°. In the embodiment shown, auger 26 is conventional, 4 inches in diameter and 15 feet, 10 inches long, and is controlled by a motor 72. At the upper end of auger 26 is air lock valve 30 which extends into the holding tank 28, which in the embodiment shown has a diameter of 48 inches and is approximately 8 feet high. The air lock valve is described in more detail below.

The second carbon auger 32 in the embodiment shown extends from the lower interior of the carbon holding tank 28, approximately central thereof, through an opening in the side of that tank. In the embodiment shown, auger 32 is 4 inches in diameter and approximately 8 feet, 6 inches long. The operation of the auger is controlled by a motor 74. The carbon which reaches the upper end of the auger 32 is moved into storage containers for disposal and/or sale.

An inner sleeve portion of the gasifier, referred to generally at 80, is shown most clearly in FIG. 2. The inner sleeve 80 extends from the top of the upper retort 20 down to a point approximately 20 inches below the lower end of the upper retort, i.e. into the lower retort 22. The inner sleeve 80 includes an L-shaped upper section 82. The L-shaped upper section 82 includes a vertical portion which is approximately 12 inches high and a lower horizontal portion which is approximately 2¼ inches wide. The horizontal portion is designed to rest on shoulder portion 54 of the upper retort. Positioned in the L-shaped upper section is sectioned firebrick or similar insulating elements 84, the firebrick being basically rectangular in cross-section, 12 inches high and 2¼ inches thick, so that it mates with the L-shaped space formed by the L-shaped wall section 82. The firebrick is positioned generally in the area of highest temperature in the gasifier; it helps to maintain a uniform temperature in that region of the gasifier and helps to decrease metal distortion and fatigue of the gasifier structure.

Extending downwardly from the L-shaped upper section 82 is a main body portion 86. Main body portion 86 in the embodiment shown also extends slightly above the horizontal portion of the L-shaped upper section 82. In the embodiment shown, the main body portion 86 is approximately 48 inches in diameter and 60 inches high, extending from a point 2–3 inches above the horizontal portion of the L-shaped upper section, to which the main body portion is attached, down to a point approximately 20 inches below the lower end of the upper retort. In the embodiment shown, the inner sleeve member is made from 10 gauge stainless steel. The dimensions of the inner sleeve can, of course, vary, depending upon the particular gasifier configuration.

In operation, inner sleeve 80 is supported by L-shaped upper wall section 82 resting on circular shoulder 54 of the upper retort 20. As can be seen from the drawings, the configuration of the inner sleeve relative to the gasifier is that an air gap exists between the inner sleeve and the inner wall 29 of the gasifier. This air gap may reasonably vary over a range of ¼ to 2 inches, although a ½-inch gap is generally preferred. The air gap provides heat insulation for the gas production bed, aiding in the uniform retention of heat within the production bed. This assists in maintaining the uniformity of temperature and hence thermal conversion within the pyrolysis zone and helps to eliminate channeling through the production bed. The input pellets are thus exposed to uniform high temperatures as they progress down through the production bed.

Further, the extended length of the inner sleeve results in the carbon pellets in the production bed being subjected to high levels of heat for a longer period of time, thereby causing additional volatiles to be driven off from the carbon than would otherwise occur. Since the inner sleeve extends a distance below where the gas discharge ports are located, the fuel gas flow is redirected so that it moves around the bottom of the inner sleeve and then out through the gas discharge ports (without any interference with gas production). It minimizes the turbulence at the gas discharge ports and substantially reduces the amount of carbon fines exiting the gasifier with the fuel gas.

Further, and perhaps most importantly, the inner sleeve, including the air gap between it and the gasifier interior wall, takes most of the effect of the high heat produced by the production bed, which would otherwise cause significant gasifier damage, including breaking of rivets and welds and overall metal fatigue in the gasifier structure. One of the heat effects which occurs in such gasifiers during extended operation is metal growth. The inner sleeve member experiences this growth (typically the sleeve "grows" a slight distance downwardly), which saves the gasifier itself from being affected.

After extended periods of operation, if the inner sleeve itself becomes damaged, either through the effects of heat or other causes, it is relatively easy to remove the inner sleeve and replace it with a new one, at a cost of several orders of magnitude less than replacing or substantially repairing the gasifier, as would otherwise be necessary. This saves both material and labor costs as well as lost operating time.

Hence, use of an inner sleeve as shown, with a small air gap between it and the interior wall of the gasifier, aids in the production of fuel gas, and has a significant effect on the overall reliable operation of the gasifier, including significantly reducing the cost of maintenance of the gasifier.

Figure 3:
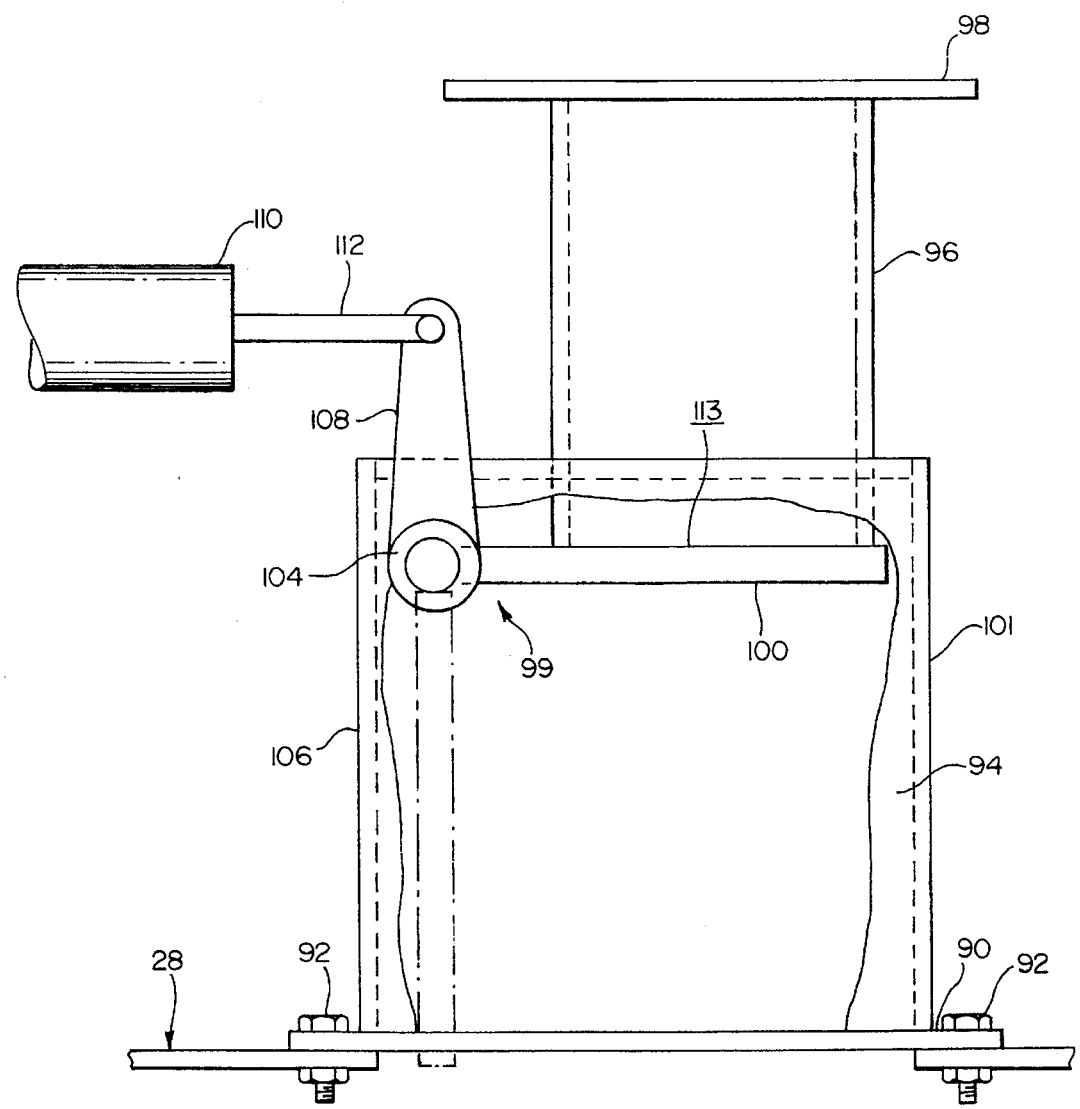
FIG. 3 is a side elevational view showing another portion of the gasifier system of FIG. 1.

FIG. 3 shows the air lock carbon tank valve of the system of FIG. 1. In the top of carbon holding tank 28 is a round opening, approximately 7½ inches in diameter in the embodiment shown. Positioned over the opening is a base plate 90 which is approximately 10 inches square and which also has a central opening in registry with the opening in the carbon tank. Base plate 90 is secured to the top of the carbon tank by means of bolts 92. Extending upwardly from the base plate 90 is a square housing 94. In the embodiment shown, housing 94 is approximately 8 inches square (horizontal plane) and 8 inches high. The lower end of the housing is secured to the base plate 90 by welding or the like.

Extending through the top of housing 94 is an entry tube 96, which in the embodiment shown is approximately 4 inches in diameter and 6¼ inches long. The entry tube is somewhat off-center of the top of the housing, being approximately 3 inches from housing wall 101. At the top of entry tube 96 is a flange 98 which is connected in an air-tight relationship with the top end of the first carbon auger 26 and connecting tube 33.

As indicated above, it is important to prevent the entry of air into the production bed in the gasifier from the back end of the gasifier, i.e. through the carbon collection tank 24 and the star valve arrangement 70 into the production bed. This can occur, for instance, when the first carbon auger 26 is operated. The air valve of FIG. 3 is intended to prevent the movement of air back into the carbon collection tank 24.

Carbon is permitted to move into tank 28 and air prevented from entering back into the gasifier by action of member 99 shown in the air lock of FIG. 3. Member 99, which acts something like a flapper, comprises a finished ½-inch plate 100, rotatably mounted on a ¾-inch shaft 104. Extending upwardly from shaft 104, which is mounted between opposing walls of housing 94 near side wall 106, is a bracket 108. Bracket 108 is fixedly mounted to shaft 104. An air ram 110 moves the bracket 108 by action of ram arm 112. Air ram 110 is mounted to the auger support structure by a bracket or similar structure (not shown).

In operation, ram arm 112 will move in a horizontal plane, forcing shaft 104 to rotate by the action of bracket 108, so that plate 100 moves between an open, i.e. vertical, position and a closed, horizontal position, in which the upper surface 113 of plate 100 lies in a sealing relationship against the free circular end of entry tube 96. Surface 113 of the plate 100 and the free end of the tube 96 are finished in such a way, i.e. a No. 32 finish, to provide the required air seal.

Hence, in operation, when carbon is moved into tube 96 and plate 100 is rotated on shaft 104 by the action of the air cylinder, carbon falls into the carbon tank 28. The shaft is then rotated again so that the plate moves back to its original closed position, preventing any air from moving into the carbon collection tank 24 during that operation.

Referring again to FIG. 1, when discharge unit 76, through which carbon moves from auger 32 into storage containers, is turned on to remove carbon from tank 28, motor 72 for the first auger 26 is locked out (shown by dotted lines in FIG. 1), which insures that flapper plate 100 remains in a closed position, preventing any backflow of air, which could produce an undesirable blow torch effect back up into the production bed. Also when discharge auger 32 is operating, a vacuum relief valve 37 located in the top of tank 28 is opened, which prevents a vacuum from being created in tank 28, which in turn would prevent carbon from being removed from tank 28 by auger 32.

Hence, an improved gasifier has been described, which in basic operation converts biomass material to carbon, while producing fuel gas, similar generally to other gasification systems. The addition of an inner removable sleeve increases the efficiency and performance of the gasifier, as well as increasing substantially the overall life of the basic gasifier system by virtue of the possible convenient removal and replacement of the sleeve. The gasifier also includes an improved air lock valve, which prevents air from entering the gasifier from the carbon removal system and a fuel spreader located at the top of the gasifier for producing an even distribution of fuel pellets.

Although a preferred embodiment of the invention has been disclosed herein for illustration, it should be understood that various changes, modifications and substitutions may be incorporated in such embodiment without departing from the spirit of the invention, which is defined by the claims which follow:

We claim:
1. A pyrolysis gasifier, comprising:
   gasifier means for reducing biomass input material to produce fuel gas, the gasifier means including means for receiving biomass input, a main body portion which includes means for supporting a pyrolysis gasification bed, and means for removing biomass residue from the gasifier;

A sleeve member positioned interiorly of the gasifier means, the sleeve member having a free lower end and being dimensioned such that it is spaced a distance inwardly from an inner wall of the gasifier, wherein an insulating effect occurs between the sleeve member and said inner wall;

Exit means for the fuel gas located in the gasifier means such that the fuel gas exits the gasifier without moving between the sleeve member and said inner wall; and Means for supporting the sleeve member in the gasifier without a fixed connection between the gasifier and the sleeve member, such that the sleeve member is free to expand and contract due to thermal stress without affecting other portions of the gasifier.

2. The gasifier of claim 1, wherein the sleeve member is removable from the gasifier and wherein the gasifier is constructed such that the interior thereof is accessible to the extent that the sleeve member can be removed therefrom.

3. The gasifier of claim 1, wherein the main body portion of the gasifier includes two sections, a first, upper section having a first diameter and an upper end and a second, lower section having a larger diameter, and wherein the sleeve member extends approximately from the upper end of the upper section down past an upper end of the lower section.

4. The gasifier of claim 1, wherein the distance is a gap of approximately ½ to 1½ inches, and wherein the sleeve extends past the upper end of the lower section for at least 12 inches.

5. The gasifier of claim 1, wherein the main body portion includes a shoulder around an inner surface thereof and wherein the sleeve member includes a horizontally extended ring portion, wherein a lower surface of the ring portion rests on the shoulder, with the remainder of the sleeve member extending downwardly therefrom.

6. The gasifier of claim 5, wherein the ring portion includes a firebrick insert arranged around an inner periphery thereof, wherein an inner face of the firebrick is coincident with an inner surface of the remainder of the sleeve member.

7. In a pyrolysis gasifier which includes means for receiving biomass input material, a main body portion which includes means for supporting a pyrolysis gasification bed and means for removing biomass residue from the gasifier:
   an inner sleeve member which is positioned internally of the gasifier means, the sleeve member being dimensioned such that it is spaced a small distance inwardly from an inner wall of the gasifier, wherein an insulating effect occurs between the sleeve member and said inner wall, wherein the sleeve member is supported in the gasifier, characterized by a lack of a fixed connection between the gasifier and the sleeve member, such that the sleeve member is free to expand and contract due to thermal stress without affecting other portions of the gasifier.

8. The sleeve member of claim 7, wherein the sleeve member is removable from the gasifier.

\* \* \* \* \*